(12) United States Patent
Schwarz et al.

(10) Patent No.: US 10,808,619 B2
(45) Date of Patent: Oct. 20, 2020

(54) INTERCOOLED COOLING AIR WITH ADVANCED COOLING SYSTEM

(71) Applicant: United Technologies Corporation, Farmington, CT (US)

(72) Inventors: Frederick M. Schwarz, Glastonbury, CT (US); Taryn Narrow, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 81 days.

(21) Appl. No.: 15/956,853

(22) Filed: Apr. 19, 2018

(65) Prior Publication Data

US 2019/0323431 A1     Oct. 24, 2019

(51) Int. Cl.
*F02C 7/18* (2006.01)
*F01D 5/18* (2006.01)
*F02C 7/32* (2006.01)

(52) U.S. Cl.
CPC .............. *F02C 7/185* (2013.01); *F01D 5/187* (2013.01); *F02C 7/32* (2013.01);
(Continued)

(58) Field of Classification Search
None
See application file for complete search history.

(56) References Cited

U.S. PATENT DOCUMENTS 2,692,476 A   10/1954   Schaal et al.
3,034,298 A * 5/1962   White ................. F01D 11/10
                                              60/726
(Continued)

FOREIGN PATENT DOCUMENTS

CN    106917641 A    7/2017
DE       2852057     6/1979
(Continued)

OTHER PUBLICATIONS

Dornheim, Michael A., Rolls-Royce Trent 1000 to Drive Boeing 787 Accessories From IP Spool, Aviation Week & Space Technology, Mar. 28, 2005, p. 51, Los Angeles, CA.
(Continued)

*Primary Examiner* — Igor Kershteyn
*Assistant Examiner* — Juan G Flores
(74) *Attorney, Agent, or Firm* — Carlson, Gaskey & Olds, P.C.

(57) ABSTRACT

A tap is connected to a location upstream of a downstream most location in a compressor to a heat exchanger. Downstream of the heat exchanger is a shut off valve and a cooling compressor. The cooling compressor is connected to a chamber provided with a check valve configured to selectively allow flow directly from a downstream location in the compressor. There is a system for stopping operation of the cooling compressor, and a control for closing the shut off valve. The cooling compressor is configured to compress air to a greater pressure than the higher pressure, such that the check valve is configured to maintain a closed position, but when said cooling compressor is not providing compressed air, the at least one check valve is configured to allow said higher pressure flow into the chamber. A method is also disclosed.

20 Claims, 3 Drawing Sheets

(52) U.S. Cl.
CPC .. *F05D 2220/323* (2013.01); *F05D 2260/211* (2013.01); *F05D 2260/213* (2013.01)

(56) References Cited

U.S. PATENT DOCUMENTS

| | | | |
|---|---|---|---|
| 3,610,698 A * | 10/1971 | Gachot | B60T 11/326 |
| | | | 303/2 |
| 3,878,677 A | 4/1975 | Colvin | |
| 4,254,618 A * | 3/1981 | Elovic | F02C 7/185 |
| | | | 60/226.1 |
| 4,304,093 A | 12/1981 | Schulze | |
| 4,539,945 A | 9/1985 | Bosisio | |
| 4,882,902 A | 11/1989 | Reigel et al. | |
| 4,967,552 A | 11/1990 | Kumata et al. | |
| 5,056,335 A | 10/1991 | Renninger et al. | |
| 5,269,135 A | 12/1993 | Vermejan et al. | |
| 5,305,616 A | 4/1994 | Coffinberry | |
| 5,392,614 A | 2/1995 | Coffinberry | |
| 5,414,992 A | 5/1995 | Glickstein | |
| 5,452,573 A * | 9/1995 | Glickstein | F02C 6/08 |
| | | | 60/39.183 |
| 5,498,126 A | 3/1996 | Pighetti et al. | |
| 5,724,806 A | 3/1998 | Horner | |
| 5,758,485 A | 6/1998 | Frutschi | |
| 5,867,979 A | 2/1999 | Newton et al. | |
| 5,918,458 A | 7/1999 | Coffinberry et al. | |
| 6,050,079 A | 4/2000 | Durgin et al. | |
| 6,065,282 A | 5/2000 | Fukue et al. | |
| 6,134,880 A | 10/2000 | Yoshinaka | |
| 6,430,931 B1 | 8/2002 | Horner | |
| 6,487,863 B1 | 12/2002 | Chen et al. | |
| 6,612,114 B1 | 9/2003 | Klingels | |
| 6,892,523 B2 | 5/2005 | Fetescu et al. | |
| 7,237,386 B2 | 7/2007 | Hoffmann et al. | |
| 7,246,484 B2 | 7/2007 | Giffin, III et al. | |
| 7,284,377 B2 | 10/2007 | Joshi et al. | |
| 7,306,424 B2 | 12/2007 | Romanov et al. | |
| 7,334,412 B2 | 2/2008 | Tiemann | |
| 7,347,637 B2 | 3/2008 | Kubo et al. | |
| 7,500,365 B2 | 3/2009 | Suciu et al. | |
| 7,552,591 B2 | 6/2009 | Bad et al. | |
| 7,698,884 B2 | 4/2010 | Maguire et al. | |
| 7,765,788 B2 | 8/2010 | Schwarz | |
| 7,823,389 B2 | 11/2010 | Seltzer et al. | |
| 7,882,691 B2 | 2/2011 | Lemmers, Jr. et al. | |
| 7,886,520 B2 | 2/2011 | Stretton et al. | |
| 7,926,289 B2 | 4/2011 | Lee et al. | |
| 8,015,828 B2 | 9/2011 | Moniz et al. | |
| 8,037,686 B2 | 10/2011 | Lasker | |
| 8,087,249 B2 | 1/2012 | Ottaviano et al. | |
| 8,181,443 B2 | 5/2012 | Rago | |
| 8,307,662 B2 | 11/2012 | Turco | |
| 8,350,398 B2 | 1/2013 | Butt | |
| 8,397,487 B2 | 3/2013 | Sennoun et al. | |
| 8,402,742 B2 | 3/2013 | Roberge et al. | |
| 8,434,997 B2 | 5/2013 | Pinero et al. | |
| 8,511,967 B2 | 8/2013 | Suciu et al. | |
| 8,522,529 B2 | 9/2013 | Martinou et al. | |
| 8,572,982 B2 | 11/2013 | Tiemann | |
| 8,602,717 B2 | 12/2013 | Suciu et al. | |
| 8,621,871 B2 | 1/2014 | McCune et al. | |
| 8,712,739 B2 | 4/2014 | Jiang et al. | |
| 8,727,703 B2 | 5/2014 | Laurello et al. | |
| 8,776,952 B2 | 7/2014 | Schwarz et al. | |
| 8,814,502 B2 | 8/2014 | Eleftheriou | |
| 8,876,465 B2 | 11/2014 | Stretton | |
| 8,961,108 B2 | 2/2015 | Bergman et al. | |
| 9,234,481 B2 | 1/2016 | Suciu et al. | |
| 9,243,563 B2 | 1/2016 | Lo | |
| 9,255,492 B2 | 2/2016 | Bacic | |
| 9,297,391 B2 | 3/2016 | Rued et al. | |
| 9,422,063 B2 | 8/2016 | Diaz | |
| 9,429,072 B2 | 8/2016 | Diaz et al. | |
| 9,816,897 B2 | 11/2017 | Ziarno | |
| 9,818,242 B2 | 11/2017 | Volponi et al. | |
| 2003/0046938 A1 | 3/2003 | Mortzheim et al. | |
| 2004/0088995 A1 | 5/2004 | Reissig | |
| 2005/0172612 A1 | 8/2005 | Yamanaka et al. | |
| 2007/0022735 A1 | 2/2007 | Henry et al. | |
| 2007/0213917 A1 | 9/2007 | Bruno et al. | |
| 2007/0245738 A1 | 10/2007 | Stretton et al. | |
| 2008/0028763 A1 | 2/2008 | Schwarz et al. | |
| 2008/0230651 A1 | 9/2008 | Porte | |
| 2008/0253881 A1 | 10/2008 | Richards | |
| 2009/0007567 A1 | 1/2009 | Porte et al. | |
| 2009/0090096 A1 | 4/2009 | Sheridan | |
| 2009/0145102 A1 | 6/2009 | Roberge et al. | |
| 2009/0196736 A1 | 8/2009 | Sengar et al. | |
| 2009/0226297 A1 | 9/2009 | Yanagi et al. | |
| 2009/0272120 A1 | 11/2009 | Tiemann | |
| 2010/0043396 A1 | 2/2010 | Coffinberry | |
| 2010/0154434 A1 | 6/2010 | Kubota et al. | |
| 2011/0036066 A1 | 2/2011 | Zhang et al. | |
| 2011/0088405 A1 | 4/2011 | Turco | |
| 2011/0120083 A1 | 5/2011 | Giffin et al. | |
| 2011/0247344 A1 | 10/2011 | Glahn et al. | |
| 2012/0067055 A1 | 3/2012 | Held | |
| 2012/0102915 A1 | 5/2012 | Baltas | |
| 2012/0159961 A1 | 6/2012 | Krautheim et al. | |
| 2012/0180509 A1 | 7/2012 | DeFrancesco | |
| 2013/0036747 A1 | 2/2013 | Fuchs et al. | |
| 2013/0067928 A1 | 3/2013 | Arias Chao et al. | |
| 2013/0098059 A1 | 4/2013 | Suciu et al. | |
| 2013/0145744 A1 | 6/2013 | Lo et al. | |
| 2013/0145774 A1 | 6/2013 | Duong et al. | |
| 2013/0186102 A1 | 7/2013 | Lo | |
| 2013/0199156 A1 | 8/2013 | Ress, Jr. et al. | |
| 2013/0239583 A1 | 9/2013 | Suciu et al. | |
| 2013/0319002 A1 | 12/2013 | Sidelkovskiy et al. | |
| 2014/0020506 A1 | 1/2014 | Duong | |
| 2014/0137417 A1 | 5/2014 | Silberberg et al. | |
| 2014/0196469 A1 | 7/2014 | Finney et al. | |
| 2014/0208768 A1 | 7/2014 | Bacic | |
| 2014/0230444 A1 | 8/2014 | Hao et al. | |
| 2014/0250898 A1 | 9/2014 | MacKin et al. | |
| 2014/0260326 A1 | 9/2014 | Schwarz et al. | |
| 2014/0311157 A1 | 10/2014 | Laurello et al. | |
| 2014/0341704 A1 | 11/2014 | Fletcher | |
| 2014/0352315 A1 | 12/2014 | Diaz | |
| 2015/0114611 A1 | 4/2015 | Morris et al. | |
| 2015/0285147 A1 | 10/2015 | Phillips et al. | |
| 2015/0308339 A1 | 10/2015 | Forcier | |
| 2015/0330236 A1 | 11/2015 | Beecroft et al. | |
| 2015/0354465 A1 | 12/2015 | Suciu et al. | |
| 2015/0354822 A1 | 12/2015 | Suciu et al. | |
| 2016/0010554 A1 * | 1/2016 | Suciu | F02C 7/06 |
| | | | 60/772 |
| 2016/0131036 A1 | 5/2016 | Bintz et al. | |
| 2016/0131037 A1 | 5/2016 | Spangler et al. | |
| 2016/0169118 A1 | 6/2016 | Duong | |
| 2016/0215732 A1 | 7/2016 | Malecki | |
| 2016/0236790 A1 | 8/2016 | Knapp et al. | |
| 2016/0237906 A1 | 8/2016 | Suciu et al. | |
| 2016/0312711 A1 | 10/2016 | Suciu et al. | |
| 2016/0312797 A1 | 10/2016 | Suciu et al. | |
| 2016/0341125 A1 | 11/2016 | Kraft et al. | |
| 2016/0369697 A1 | 12/2016 | Schwarz et al. | |
| 2017/0009657 A1 | 1/2017 | Schwarz et al. | |
| 2017/0044980 A1 | 2/2017 | Duesler et al. | |
| 2017/0044982 A1 | 2/2017 | Duesler et al. | |
| 2017/0152765 A1 | 6/2017 | Uechi et al. | |
| 2017/0159568 A1 | 6/2017 | Sennoun et al. | |
| 2017/0167388 A1 | 6/2017 | Merry et al. | |
| 2017/0175632 A1 | 6/2017 | Hanrahan et al. | |
| 2017/0184027 A1 | 6/2017 | Moniz et al. | |
| 2017/0204787 A1 | 7/2017 | Duesler et al. | |
| 2017/0234224 A1 | 8/2017 | Adibhatla | |

FOREIGN PATENT DOCUMENTS

| | | |
|---|---|---|
| EP | 0447886 | 9/1991 |
| EP | 0469825 | 2/1992 |
| EP | 0608142 | 7/1994 |
| EP | 0903484 | 3/1999 |

(56) References Cited

FOREIGN PATENT DOCUMENTS

| | | |
|---|---|---|
| EP | 1314872 | 5/2003 |
| EP | 1944475 | 7/2008 |
| EP | 2085599 | 8/2009 |
| EP | 2128023 | 12/2009 |
| EP | 2362081 | 8/2011 |
| EP | 2540991 | 1/2013 |
| EP | 2584172 | 4/2013 |
| EP | 2604825 | 6/2013 |
| EP | 2733322 | 5/2014 |
| EP | 2865981 | 4/2015 |
| EP | 2942490 | 11/2015 |
| EP | 2960468 A1 | 12/2015 |
| EP | 3085923 | 10/2016 |
| EP | 3085924 | 10/2016 |
| EP | 3121411 | 1/2017 |
| EP | 3296543 A1 | 3/2018 |
| FR | 2851295 | 8/2004 |
| GB | 1244340 | 8/1971 |
| GB | 2152148 | 7/1985 |
| GB | 2536628 A | 9/2016 |
| JP | H1136889 | 2/1999 |
| RU | 2016115404 C2 | 10/2017 |
| WO | 2003037715 | 5/2003 |
| WO | 2008082335 | 7/2008 |
| WO | 2013154631 | 10/2013 |
| WO | 2014046713 | 3/2014 |
| WO | 2014092777 | 6/2014 |
| WO | 2014120125 | 8/2014 |

OTHER PUBLICATIONS

U.S. Appl. No. 15/232,101.
U.S. Appl. No. 14/964,984.
U.S. Appl. No. 14/967,446.
U.S. Appl. No. 15/069,197.
U.S. Appl. No. 15/269,014.
U.S. Appl. No. 15/373,072.
European Search Report for European Application No. 16166707.6 dated Sep. 26, 2016.
European Search Report for European Application No. 16166724.1 dated Sep. 26, 2016.
European Search Report for European Patent Application No. 16154635.3 dated Jul. 6, 2016.
European Search Report for European Application No. 16155316.9 completed Jun. 30, 2016.
European Search Report for Application No. 16170021.6 dated Oct. 11, 2016.
European Search Report for Application No. 16174862.9 dated Nov. 7, 2016.
European Search Report for European Application No. 16175531.9 dated Nov. 15, 2016.
European Search Report for European Application No. 16175533.5 dated Nov. 15, 2016.
European Search Report for European Application No. 16175552.5 dated Nov. 17, 2016.
European Search Report for European Application No. 16175760.4 dated Nov. 16, 2016.
European Search Report for Application No. 16178207.3 dated Nov. 21, 2016.
European Search Report for European Application No. 16202876.5 dated Apr. 24, 2017.
European Search Report for European Application No. 16180657.5 dated Dec. 16, 2016.
European Search Report for EP Application No. 17160816.9 dated Jul. 21, 2017.
European Search Report for EP Application No. 19170209.1 dated Aug. 22, 2019.
European Search Report for EP Application No. 19170148.1 dated Aug. 19, 2019.

* cited by examiner

INTERCOOLED COOLING AIR WITH ADVANCED COOLING SYSTEM

BACKGROUND

This disclosure relates to an intercooled cooling air system for a gas turbine engine which has enhanced cooling features.

Gas turbine engines are known and typically include a fan delivering air into a bypass duct as bypass air and into a compressor as core airflow. The air is compressed in the compressor and delivered into a combustor where it is mixed with fuel and ignited. Products of this combustion pass downstream over turbine rotors, driving them to rotate.

As known, the turbine section sees very high temperatures and, thus, it is desirable to provide cooling air to the turbine. In addition, one trend in modern gas turbine engines is to increase the pressures reached by the compressor section. This raises temperature challenges at different components in the compressor section and, in particular, the disk and hubs.

SUMMARY

In a featured embodiment, a gas turbine engine includes a plurality of rotatable components housed within a compressor section and a turbine section. A tap is connected to a location upstream of a downstream most location in the compressor section. The tap is connected to a heat exchanger. Downstream of the heat exchanger is a shut off valve and downstream of the shut off valve is a cooling compressor. The cooling compressor is connected to deliver cooling air through a chamber, and then to at least one of the plurality of rotatable components. The chamber is provided with at least one check valve configured to selectively allow flow directly from a more downstream location in the compressor section than the location upstream. The flow from the more downstream location has a higher pressure than a flow from the location upstream. There is a system for stopping operation of the cooling compressor. There is a control for closing the shut off valve. The cooling compressor is configured to compress air to a greater pressure than the higher pressure, such that when the cooling compressor is providing air, the at least one check valve is configured to maintain a closed position, but when said cooling compressor is not providing compressed air, the at least one check valve is configured to allow said higher pressure flow into said chamber.

In another embodiment according to the previous embodiment, the greater pressure is between 100% and 130% of the higher pressure when the gas turbine engine is operating at sea level take-off conditions.

In another embodiment according to any of the previous embodiments, the shut off valve and the cooling compressor are controlled such that effective compression by the cooling compressor is stopped before effective flow through the shut off valve to the cooling compressor is stopped.

In another embodiment according to any of the previous embodiments, the chamber is within a strut in a diffuser downstream of the compressor section.

In another embodiment according to any of the previous embodiments, the chamber is positioned outwardly of a diffuser downstream of the main compressor section.

In another embodiment according to any of the previous embodiments, the greater pressure is between 110% and 130% of the higher pressure when the gas turbine engine is operating at sea level take-off conditions.

In another embodiment according to any of the previous embodiments, the high pressure air is downstream of the downstream most location.

In another embodiment according to any of the previous embodiments, the system is a clutch, selectively opened by the control to stop operation of the cooling compressor.

In another featured embodiment, a gas turbine engine includes a plurality of rotatable components housed within a compressor section and a turbine section. A tap is connected to a location upstream of a downstream most location in the compressor section. The tap is connected to a heat exchanger. Downstream of the heat exchanger is a shut off valve and downstream of that is a cooling compressor. The cooling compressor is connected to deliver cooling air through a chamber, and then to at least one of said plurality of rotatable components. The chamber is provided with at least one check valve configured to selectively allow flow directly from a more downstream location in the compressor section than the location upstream. The flow from the more downstream location has a higher pressure than a flow from the location upstream. There is a means for stopping operation of the cooling compressor. There is a means for closing the shut off valve. The cooling compressor is configured to compress air to a greater pressure than the higher pressure, such that when the cooling compressor is providing air, the at least one check valve is configured to maintain a closed position, but when the cooling compressor is not providing compressed air, the at least one check valve is configured to allow the higher pressure flow into the chamber.

In another embodiment according to the previous embodiment, the means for stopping operation is a clutch that can be selectively opened.

In another embodiment according to any of the previous embodiments, the means for closing includes a control and the shut off valve is electrically controllable.

In another featured embodiment, a method of operating a gas turbine engine includes the steps of rotating components within a housing including a main compressor section and a turbine section. Air is tapped from a location upstream of a downstream most location in the main compressor section. The tapped air passes through a heat exchanger, a shut off valve and then to a cooling compressor. The cooling compressor delivers cooling air through a chamber, and then to at least one of the rotating components. The chamber is provided with check valve to allow flow of high pressure air compressed by the main compressor section to a higher pressure than the pressure at the location upstream. The cooling compressor compresses air to a greater pressure than the higher pressure, such that when the cooling compressor is providing air, the check valve is maintained closed, and selectively stopping operation of the cooling compressor such that the at least one check valve opens to allow flow of the high pressure air.

In another embodiment according to the previous embodiment, the greater pressure is between 100% and 130% of the higher pressure when the gas turbine engine is operating at sea level take-off conditions.

In another embodiment according to any of the previous embodiments, the high pressure air is from downstream of the downstream most location.

In another embodiment according to any of the previous embodiments, the cooling compressor is provided with a clutch that is opened to stop operation of the cooling compressor.

In another embodiment according to any of the previous embodiments, the shut off valve is closed to stop flow of air to the cooling compressor when the cooling compressor is stopped.

In another embodiment according to any of the previous embodiments, the shut off valve and the cooling compressor are controlled such that effective compression by the cooling compressor is stopped before effective flow through the valve to the cooling compressor is stopped.

In another embodiment according to any of the previous embodiments, the high pressure air is from downstream of the downstream most location.

In another embodiment according to any of the previous embodiments, the cooling compressor is operated during higher power conditions of the gas turbine engine. The cooling compressor operation is stopped under lower power conditions.

In another embodiment according to any of the previous embodiments, the higher power conditions include take off of an associated aircraft. The lower power conditions include a cruise condition of the associated aircraft.

These and other features may be best understood from the following drawings and specification.

DETAILED DESCRIPTION

Figure 1:
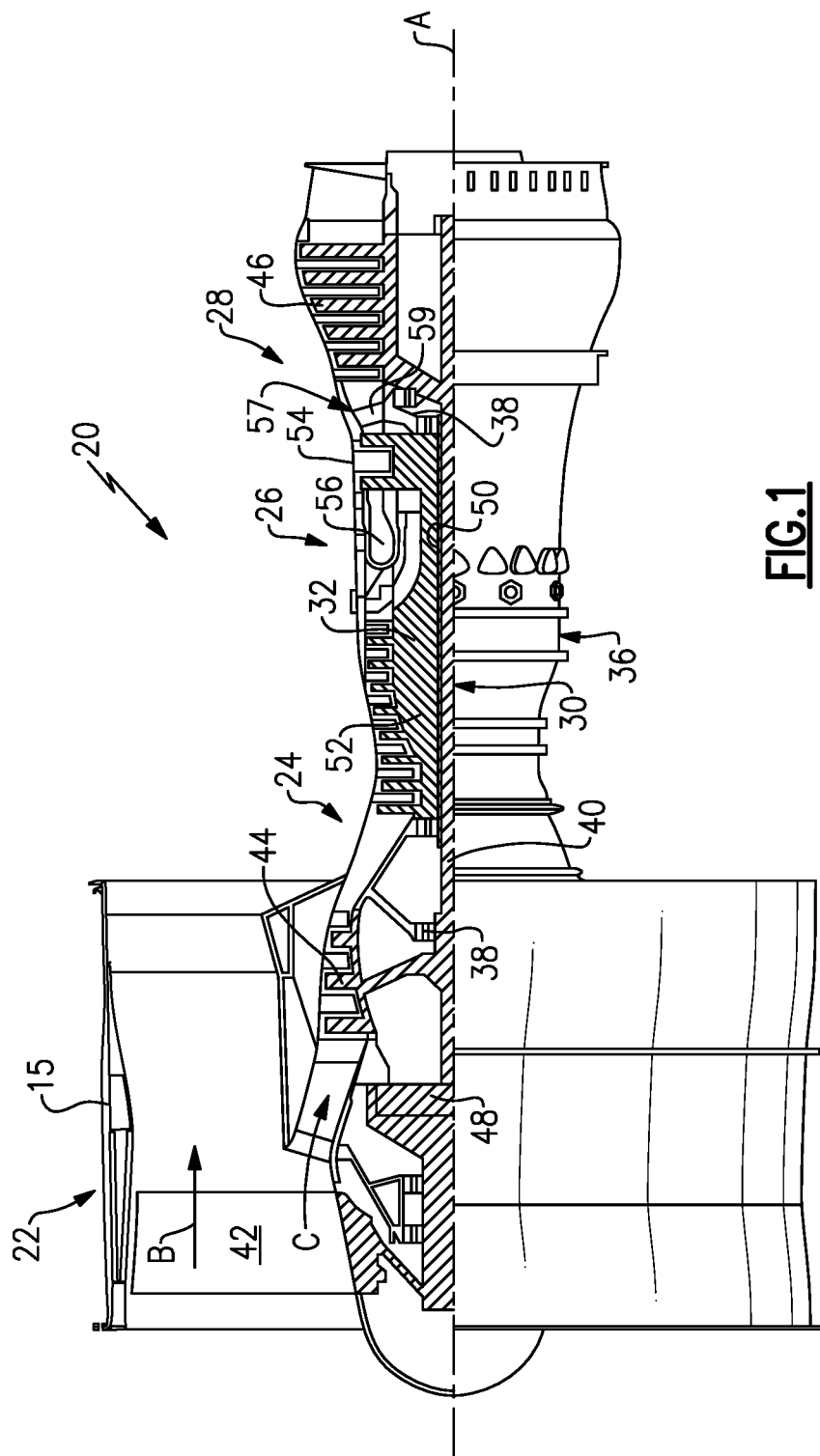
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7\ °R)]^{0.5}$. The "Low corrected fan tip speed" as disclosed herein according to one non-limiting embodiment is less than about 1150 ft/second (350.5 meters/second).

Figure 2A:
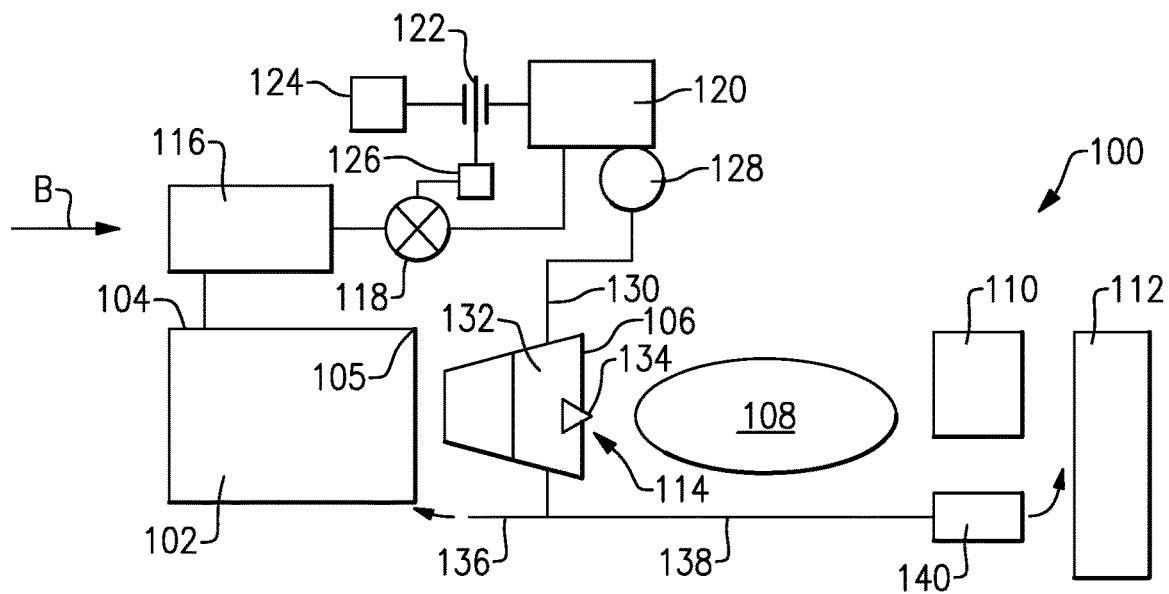
FIG. 2A shows an intercooled cooling system.

FIG. 2A shows a system 100 for providing cooling air to rotatable components, such as a rotor in the compressor section and/or blades in the turbine section.

As shown, the compressor section 102 has a tap 104 connected to tap compressed air for use as cooling air. In the FIG. 2A embodiment, the tap 104 is upstream of a downstream most location 105. By tapping air at the more upstream location, efficiencies are achieved by not utilizing air that has been compressed up to the final downstream position 105.

Modern gas turbine engines have increasing pressure and temperature challenges at both the downstream portions of the high pressure compressor and the upstream portions of the high pressure turbine. As such, the tapped air is passed through a heat exchanger 116, in which the tapped air is cooled, such as by bypass air B. Notably, the air could be cooled in locations other than the bypass duct and by fluid other than bypass air B. The air then passes downstream to a valve 118 and to a cooling compressor 120.

As shown, the cooling compressor is driven through a clutch 122 by an electric motor 124 or 124 could be representative of a shaft connection to one of the engine's spools. A control 126 is operable to control the valve 118 and clutch 122. Valve 118 may be an electrically controllable valve. In particular, during high power operation, the cooling compressor 120 may be utilized to supply compressed cooling air, as will be described below. On the other hand, during lower power operation, say cruise and, idle, the air flow from cooling compressor 120 may be stopped. This can be achieved by opening the clutch 122 and closing the valve 118. Notably, it is desirable that the control 126 be operable to stop effective drive of the compressor 120 before the effective airflow to the compressor 120 is stopped by valve 118.

While a clutch 122 is shown, in other embodiments, the motor 124 may simply be stopped by the control 126. A compressor diffuser 106 is positioned downstream of the cooling compressor 120. Air passes into a line 130 and then through a strut 132 in a compressor diffuser 106, which is downstream of the downstream most location 105. As known, there are actually a plurality of struts 132 which serve the purpose of connecting inner and outer parts of a diffuser case (not shown) that connects to the endo of the compressor; and surrounds the combustor 108. As shown, the diffuser 106 is upstream of a combustor section 108, a first row turbine vane 110, and a first row turbine blade 112. The air in the struts 132 passes into passageways or optional lines flowing toward 136 and/or 138. Line or passage 136 extends to cool the disks and hubs of at least the downstream most rotor in a high pressure compressor. Line 138 may pass through a tangential on-board injector 140 (TOBI) and then to cool the blade 112 and vane 110. Instead of a TOBI, other type pre-swirlers may be used. Notably, a chamber 114 is downstream of the point 105 and surrounds the compressor 108.

Figure 2B:
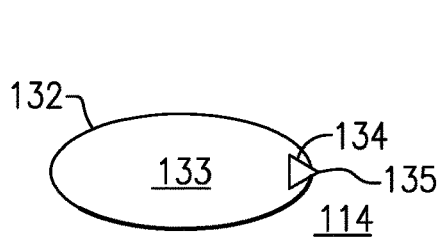
FIG. 2B is a cross section.

FIG. 2B shows the interior of the strut 132. As shown, an interior chamber 133 receives the air passing inwardly from line 130. A check valve 134 blocks flow of air from the chamber 114 as long as the pressure of the air at line 130 is higher than the pressure of the air in chamber 114.

In embodiments of this disclosure, the cooling compressor 120 is designed such that it compresses the air to a pressure significantly higher than the pressure downstream of the downstream point 105. The pressure at point 105 is typically known as $P_3$. The cooling compressor 120 is designed to achieve an output of at least about 90% of $P_3$ but it might also be designed to reach greater than 100% $P_3$ and in certain applications with different cooling requirements it might go well above $P_3$ such as 110%-130% of the $P_3$ pressure, with the output ratio relative to $P_3$ pressure being defined at 86° F. sea level take-off conditions. In one embodiment it achieves 130% of $P_3$. Thus, as long as the compressor 120 is delivering air into the strut 132, the valve 134 will remain closed and the flow provided to the chamber 133 is not lost to the passage labeled 135. In the scenario where the cooling compressor pressure is less than, or equal to $P_3$, the alternative air controlled by valve 134 will be less than $P_3$, and still less than the cooling compressor pressure.

The control 126 is can be typically programmed to maintain this airflow during take-off, climb, and other relatively high power conditions.

Figure 2C:
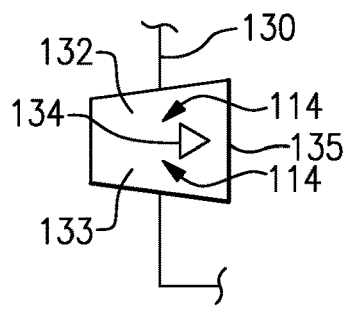
FIG. 2C shows the FIG. 2A system in a distinct operational condition.

On the other hand, as shown at FIG. 2C, during lower power conditions, such as idle or cruise, the control 126 stops flow of the compressed air from the cooling air compressor 120. Under such conditions, the valve 134 opens due to the higher pressure in chamber 114. The air passing into chamber 133 through passage 135 is now air which has not been compressed by the cooling compressor 120, but rather the air at pressure $P_3$.

This provides efficiencies, in that the cooling compressor 120 is not utilized when not needed and the extraction of power required from the engine for compressor work is reduced.

Figure 3:
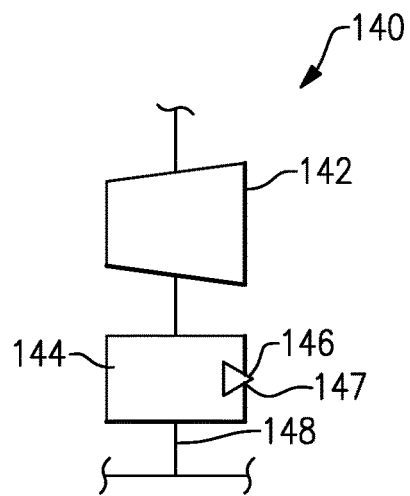
FIG. 3 shows another embodiment.

FIG. 3 shows another embodiment wherein the strut 142 is not the location of where the alternate flow of the air from chamber 114 or the cooling compressor occurs. Rather, there is a chamber 144 located away from the strut 142 which has the check valves 146 closing supply opening 147 which is a connection to air at a lower pressure than that delivered by the cooling compressor during its operation. This embodiment would otherwise operate as the FIG. 2A/2B embodiment.

It should be understood that there would be a plurality of the struts 132 and a plurality of the struts would receive check valves 134.

The chamber 144 may be a single chamber having a plurality of check valves 146, or could be a plurality of discrete chambers.

At any rate, by utilizing a cooling compressor 120, which compresses the air significantly above $P_3$, economies are achieved with a number of features.

Figure 4:
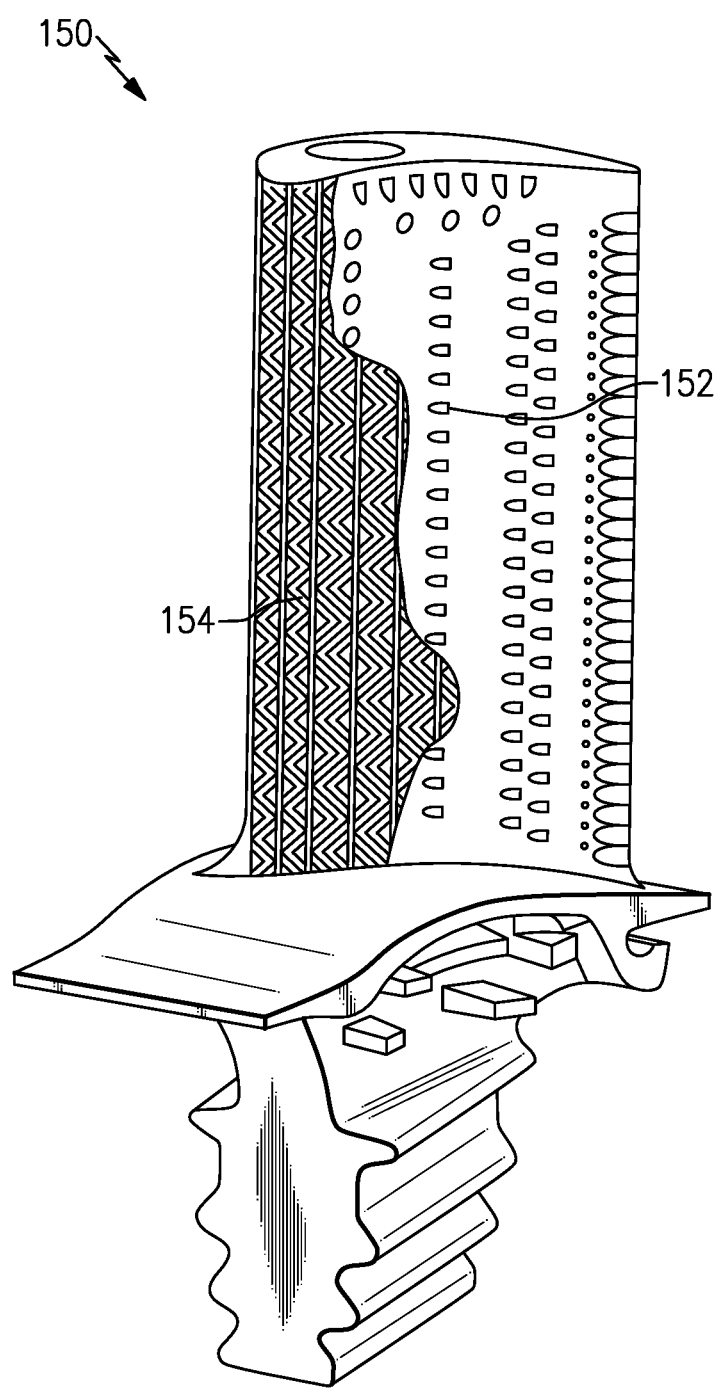
FIG. 4 shows features of a turbine blade.

FIG. 4 is an example of a turbine blade 150. As known, turbine blade 150 has skin cooling holes, such as shown at 152, and internal cooling channels with heat transfer elements, such as trip strips, as shown at 154.

The turbine blade 150, in modern gas turbine engines, is designed such that it can handle the increasing temperatures and pressures. Thus, in modern gas turbine engine designs, the walls of the turbine blade may be thinner, trip strips, the number of internal passes, the size of the holes, and the spacing between the holes may all be controlled to increase the cooling potential of the cooling air passing through the turbine blade 150.

Since the design of the turbine blade 150 must be adequate to cool the turbine blade at the highest power conditions, a worker in this art has faced a design choice between increasing the cooling potential for the higher power conditions, and living with the efficiency losses from all of the additional cooling structures at lower power conditions. It should be understood that the typical features to increase cooling potential reduce the pressure loss across the turbine blade. Thus, a turbine blade designed for high cooling potential at high power operation would be undesirably inefficient at lower power operation as there is less resistance to flow and, a greater amount of cooling airflow at the lower power conditions.

However, given the cooling compressor 120 and its higher pressure operation at selected higher power conditions, the turbine blade 150 can be designed to have less cooling potential under the lower power conditions and at the lower $P_3$ pressure level seen at the entrance to the cooling passages of the blade when the cooling compressor 120 is not delivering cooling airflow. The higher pressure at conditions where the cooling compressor 120 is delivering its higher pressure air is able to drive through an adequately cooled turbine blade even for a turbine blade having lesser cooling potential.

Accordingly, relative to a prior art one-$P_3$-supply-pressure blade the skin holes might be smaller or spread further apart or, internally the passages might be more narrow or the trips strips higher, all to reduce the flow and provide fuel consumption benefits to the engine during low power conditions when higher flow is not needed. But, at high power and with high pressure supplied by the cooling compressor, the flow through the blade might be the same as the one-pressure blade or even higher owing to the elevated pressure chosen by the designer the blade service life goals he has.

A worker of ordinary skill in this art would recognize that many other components may be more optimally designed given the power of this disclosure.

Stated another way, a gas turbine engine has a plurality of rotatable components housed within a compressor section and a turbine section. A tap is connected to a location upstream of a downstream most location in the compressor section. The tap is connected to a heat exchanger. Downstream of the heat exchanger is a shut off valve. Downstream of the shut off valve is a cooling compressor. The cooling compressor is connected to deliver cooling air through a chamber, and then to at least one of the plurality of rotatable components. The chamber is provided with at least one check valve configured to selectively allow flow directly from a more downstream location in the compressor section than the location upstream. The flow from the more downstream location has a higher pressure than a flow from the location upstream. There is a means for stopping operation of the cooling compressor. There is a means for closing the shut off valve. The cooling compressor is configured to compress air to a greater pressure than the higher pressure, such that when the cooling compressor is providing air, the at least one check valve is configured to maintain a closed position, but when the cooling compressor is not providing compressed air, the at least one check valve is configured to allow the higher pressure flow into the chamber.

Although an embodiment of this invention has been disclosed, a worker of ordinary skill in this art would recognize that certain modifications would come within the scope of this disclosure. For that reason, the following claims should be studied to determine the true scope and content of this disclosure. For that reason, the following claims should be studied to determine the true scope and content of this disclosure.

The invention claimed is:

1. A gas turbine engine comprising:
   a plurality of rotatable components housed within a compressor section and a turbine section;
   a tap connected to a location upstream of a downstream most location in said compressor section, said tap connected to a heat exchanger, downstream of the heat exchanger is a shut off valve and downstream of said shut off valve is a cooling compressor, said cooling compressor being connected to deliver cooling air through a chamber, and then to at least one of said plurality of rotatable components, and said chamber being provided with at least one check valve configured to selectively allow flow directly from a more downstream location in said compressor section than the location upstream, wherein said flow from said more downstream location has a higher pressure than a flow from the location upstream;
   a stopping system for stopping operation of said cooling compressor;
   a control for closing said shut off valve; and
   wherein said cooling compressor is configured to compress air to a greater pressure than said higher pressure, such that when said cooling compressor is providing air, said at least one check valve is configured to maintain a closed position, but when said cooling compressor is not providing air, said at least one check valve is configured to allow said higher pressure flow into said chamber.

2. The gas turbine engine as set forth in claim 1, wherein said greater pressure is between 100% and 130% of said higher pressure when the gas turbine engine is operating at sea level take-off conditions.

3. The gas turbine engine as set forth in claim 1, wherein said shut off valve and said cooling compressor are controlled such that effective compression by said cooling compressor is stopped before effective flow through said shut off valve to said cooling compressor is stopped.

4. The gas turbine engine as set forth in claim 1, wherein said chamber is within a strut in a diffuser downstream of said compressor section.

5. The gas turbine engine as set forth in claim 1, wherein said chamber is positioned outwardly of a diffuser downstream of said compressor section.

6. The gas turbine engine as set forth in claim 1, wherein said greater pressure is between 110% and 130% of said higher pressure when the gas turbine engine is operating at sea level take-off conditions.

7. The gas turbine engine as set forth in claim 1, wherein said higher pressure air is downstream of said downstream most location.

8. The gas turbine engine as set forth in claim 1, wherein said stopping system for stopping operation is a clutch, selectively opened by said control to stop operation of said cooling compressor.

9. A gas turbine engine comprising:
   a plurality of rotatable components housed within a compressor section and a turbine section;
   a tap connected to a location upstream of a downstream most location in said compressor section, said tap connected to a heat exchanger, downstream of the heat exchanger is a shut off valve and downstream of that is a cooling compressor, said cooling compressor being connected to deliver cooling air through a chamber, and then to at least one of said plurality of rotatable components, and said chamber being provided with at least one check valve configured to selectively allow flow directly from a more downstream location in said compressor section than the location upstream, wherein said flow from said more downstream location has a higher pressure than a flow from the location upstream;
   means for stopping operation of said cooling compressor;
   means for closing said shut off valve; and
   wherein said cooling compressor is configured to compress air to a greater pressure than said higher pressure, such that when said cooling compressor is providing air, said at least one check valve is configured to maintain a closed position, but when said cooling compressor is not providing air, said at least one check valve is configured to allow said higher pressure flow into said chamber.

10. The gas turbine engine as set forth in claim 9, wherein said means for stopping operation is a clutch that can be selectively opened.

11. The gas turbine engine as set forth in claim 9, wherein said means for closing includes a control and said shut off valve being electrically controllable.

12. A method of operating a gas turbine engine comprising the steps of:
   rotating components within a housing including a main compressor section and a turbine section;
   tapping air from a location upstream of a downstream most location in said main compressor section, said tapped air passing through a heat exchanger, a shut off valve and then to a cooling compressor, said cooling compressor delivering cooling air through a chamber, and then to at least one of said rotating components, and said chamber being provided with at least one check valve to allow flow of high pressure air compressed by said main compressor section to a higher pressure than the pressure at said location upstream; and
   said cooling compressor compressing air to a greater pressure than said higher pressure, such that when said cooling compressor is providing air, said at least one check valve is maintained closed, and selectively stopping operation of said cooling compressor such that said at least one check valve opens to allow flow of said high pressure air.

13. The method as set forth in claim 12, wherein said greater pressure is between 100% and 130% of said higher pressure when the gas turbine engine is operating at sea level take-off conditions.

14. The method as set forth in claim 13, wherein said high pressure air is from downstream of said downstream most location.

15. The method as set forth in claim 12, wherein said cooling compressor is provided with a clutch that is opened to stop operation of said cooling compressor.

16. The method as set forth in claim 15, wherein said shut off valve being closed to stop flow of air to said cooling compressor when said cooling compressor is stopped.

17. The method as set forth in claim 16, wherein said shut off valve and said cooling compressor are controlled such that effective compression by said cooling compressor is stopped before effective flow through said shut off valve to said cooling compressor is stopped.

18. The method as set forth in claim 12, wherein said high pressure air is from downstream of said downstream most location.

19. The method as set forth in claim 12, wherein said cooling compressor is operated during higher power conditions of the gas turbine engine, and wherein said cooling compressor operation is stopped under lower power conditions.

20. The method as set forth in claim 19, wherein said higher power conditions include take off of an associated aircraft, and said lower power conditions include a cruise condition of the associated aircraft.

\* \* \* \* \*